United States Patent

[11] 3,625,857

[72] Inventors Dean R. Weimer
Ponca City, Okla.;
James A. Wingrave, Emporia, Kans.
[21] Appl. No. 773,337
[22] Filed Nov. 4, 1968
[45] Patented Dec. 7, 1971
[73] Assignee Continental Oil Company
Ponca City, Okla.

[54] OIL SPILL DISPERSANT AND METHOD FOR EMPLOYING SAME
10 Claims, No Drawings

[52] U.S. Cl........................................................ 252/312,
210/59, 252/351
[51] Int. Cl......................................................... B01j 13/00
[50] Field of Search............................................ 252/353,
351, 60, 312; 210/59

[56] References Cited
UNITED STATES PATENTS
2,762,780  9/1956  Kulakow ..................... 252/358 X
3,086,944  4/1963  Wedell ......................... 252/358 X
3,198,731  8/1965  DeLew ......................... 210/59 X
3,484,370  12/1969  Simon .......................... 210/59 X OTHER REFERENCES
Chemical Abstracts Vol. 68, col. 71965h (1968)
Hoult, Oil On the Sea, Plenum Press, New York (1969) pp29–51

*Primary Examiner*—John D. Welsh
*Attorneys*—Joseph C. Kotarski, Henry H. Huth, Jerry B. Peterson, Glen M. Burdick, Carroll Palmer and Kemon, Palmer, Stewart and Estabrook

ABSTRACT: A composition for removing oil spills and a method for employing same is provided wherein the composition comprises from about 80 to 0 weight percent of an anionic surfactant or pine oil and from about 20 to 100 weight percent of a nonionic compound which contains from about 2 to 4 ($CH_2CH_2O$) units.

OIL SPILL DISPERSANT AND METHOD FOR EMPLOYING SAME

BACKGROUND OF THE INVENTION

2. Field of the Invention

This invention relates to dispersants. In one aspect this invention relates to oil spill dispersants. In another aspect, this invention relates to oil spill dispersants which are capable of emulsifying and dispersing oil at substantially infinite dilution. In another aspect this invention relates to an oil spill dispersant that effectively emulsifies and disperses both high- and low-viscosity oil in salt water or brackish water upon infinite dilution. In still another aspect, this invention relates to a method for applying the oil spill dispersants to effectively emulsify and disperse oil.

2. Brief Description of the Prior Art

Oil spills on water and around beach areas have created many problems. For instance, an oil spill on a water surface is a fire hazard, a danger to wildlife, and a nuisance at public beaches and recreation areas. Much work has been done in recent years in an effort to clean up oil spills.

Currently, several types of oil slick dispersant products are available on the market. However, these dispersants are water soluble, i.e., hydrophilic, and these water soluble oil slick dispersant products dissolve into water quickly and thus do not function to satisfactorily disperse the oil slick at infinite dilution. Thus, there are at present no commercially available oil slick dispersant products that satisfactorily disperse and emulsify oil on large bodies of water.

OBJECTS OF THE INVENTION

An object of the present invention is to provide a composition which is effective in dispersing oil slick. ANother object of the invention is to provide an oil slick dispersant composition which emulsifies and disperses both high- and low-viscosity oils in salt water or brackish water. Another object of the invention is to provide a composition for removing oil spills deposited on shore line which is effective in both brackish water and salt water. Another object of the invention is to provide a composition for removing oil spills which effectively emulsifies and disperses the oil upon infinite dilution with water.

Another object of the present invention is to provide a method for effectively cleaning up oil spills on a body of water and around the shore line of a body of water. These and other objects, advantages, and features of the present invention will become apparent to those skilled in the art from a study of the following written description and appended claims.

SUMMARY OF THE INVENTION

We have now found an oil spill dispersant composition which readily penetrates the oil and emulsifies and disperses the oil at substantially infinite water dilution. Further, the oil spill dispersant composition of the present invention disperses and emulsifies both high- and low-viscosity oil slick on both salt and brackish water.

The present invention relates to a composition for removing oil spills which comprises from about 80 to 0 weight percent of pine oil or an anionic surfactant and from about 20 to 100 weight percent of a nonionic compound containing from about 2 to 4 ethoxylated units in the compound.

Further, we have surprisingly found that, by maintaining the ethoxylation portion of an ethoxylated alcohol in the range of about 2 to 4 units while increasing the carbon chain lengths of the alcohol portion of the ethoxylated alcohol, better dispersion and emulsification of the oil results. In other words we have found that the more lipophilic ethoxylated alcohols gave vastly superior results over hydrophilic ethoxylated alcohols because the lipophilic ethoxylated alcohols mixed with the oil more easily and more completely before carrying the oil into the water. Further, it was found that the lipophilic ethoxylated alcohol remained in the oil phase rather than being eluded in water dilution.

One specific aspect of the present invention relates to a composition for removing oil spills from a body of water where the oil has an API gravity of at least 22, which comprises from about 80 to 0 weight percent of pine oil or an anionic surfactant selected from the group consisting of an alkoxy polyethylene oxide adduct, an alkylphenoxy polyethlene oxide adduct, an alkyl sulfonate, an alkene sulfonate, an alkyl aryl sulfonate, a sulfate, and from about 20 to 100 weight percent of a nonionic compound having the general formula $R_6(OCH_2CH_2)_nOH$ in which $R_6$ is an alkyl radical having about 10 to 20 carbon atoms and $n$ is an integer of from about 2–4. In another aspect the present invention relates to a composition for removing oil spills where the composition is formed by blending from about 90 to 60 weight percent of a mixture of either pine oil or anionic surfactant and the nonionic compound with from about 10 to 40 weight percent of a hydrocarbon diluent. The resulting composition can then be employed for removing oil spills where the oil has a gravity of at least 22.

The present invention further relates to oil dispersant composition for removing oil spills where the oil has a gravity of 22 or less which comprises from about 40 to 60 weight percent of an anionic surfactant selected from the group consisting of an alkoxy polyethylene oxide adduct, an alkylphenoxy polyethylene oxide adduct, an alkyl sulfonate, an alkene sulfonate, an alkyl aryl sulfonate, and a sulfate: from about 30 to 20 weight percent of a nonionic compound having the general formula $R_6(OCH_2CH_2)_nOH$ wherein $R_6$ and $n$ are as defined above, and at least 20 weight percent of a petroleum distillate diluent.

In still another aspect the present invention relates to a method for removing oil spills which comprises contacting the oil with an oil dispersant composition containing from about 80 to 0 weight percent of pine oil or an anionic surfactant and from about 20 to 100 weight percent of a nonionic compound having the general formula $R_6(OCH_2CH_2)_nOH$ wherein $R_6$ and $n$ are as defined above.

DESCRIPTION OF PREFERRED EMBODIMENTS

An oil spill dispersant which effectively disperses and emulsifies oil spills on large bodies of water, or around the surrounding shore line, is provided which comprises from about 80 to 0 weight percent of pine oil or an anionic surfactant and from about 20 to 100 weight percent of a nonionic compound having the general formula $R_6(OCH_2CH_2)_nOH$ in which $R_6$ is an alkyl radical having about 10 t0 20 carbon atoms and $n$ is an integer of from about 2 to 4. The term "disperse" as used in the present application is employed to define the ability of the dispersant to wet an oil slick or spill and cause the oil to break apart into smaller slicks instead of coagulating on the water surface. Likewise, the term "emulsify" is defined as the ability of the dispersant to cause the oil to be suspended down in the water rather than on the surface of the water.

In order to provide a dispersant composition which is effective for removing oil spills from a body of water or from the surrounding shore line, the composition of the dispersant needs to be varied depending upon the particular type of oil present in the oil slick. For instance, where the oil producing the oil click has an API gravity of at least 22, the oil dispersant composition contains from about 80 to 0 weight percent of pine oil or an anionic surfactant selected from the group consisting of an alkoxy polyethylene oxide sulfate or phosphate ester, an alkylphenoxy polyethylene oxide sulfate or phosphate ester, an alkyl sulfonate, an alkene sulfonate, an alkyl aryl sulfonate, an alkyl sulfate, and from about 20 to 100 weight percent of a nonionic compound having the general formula $R_6(OCH_2CH_2)_nOH$ in which $R_6$ is an alkyl radical having about 10 to 20 carbon atoms and $n$ is an integer of about 2–4. Thus, it is clearly evident that the composition for removing oil spills can consist of the nonionic compound as defined above. However, we have found that the preferred oil dispersant composition contains from about 5 to 15 weight percent of pine oil or anionic surfactant and from about 95 to 85 weight percent of the nonionic compound. Further, we have found that it is desirable that the alkyl radical portion of the nonionic compound contains from about 12 to 14 carbon atoms in order to have the desired lipophilic properties to enable the composition to emulsify the oil into the water, and at the same time contain from about 2.5 to 3.0 hydrophilic ethoxylated units so that the composition mixes with the oil readily and completely before carrying the oil under the surface of the water. Further, by employing the nonionic wherein the alkyl portion contains 12 to 14 carbon atoms and the hydrophilic ethoxylated units are present in the range of about 2.5 to 3.0, the dispersant remains in the oil phase even after the oil phase is removed below the surface of the water rather than being eluded in water dilution.

The alkoxy polyethylene oxide phosphate esters which can be employed as the anionic surfactant constituent of the present dispersant composition can be represented by the general formula $R(OCH_2CH_2)_nPO_3M_2$ wherein $n$ is an integer from about 2 to 10, R is an alkyl radical having about 8 to 18 carbon atoms, and M is a cation selected from the group consisting of hydrogen, alkali metal, and ammonium. Suitable alkoxy polyethylene oxide esters having the general formula described immediately above can be prepared by the following series of steps:

1. 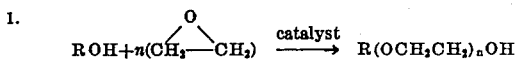

where R is a hydrocarbon group having between eight and 18 carbon atoms, such as n-decyl, n-dodecyl, 2-tetradecyl, hexadecyl, octadecyl, and the like and $n$ is between 2 and 10 moles of ethylene oxide. The catalyst employed can be either a basic catalyst or an acidic catalyst, such as NaOH or $BF_3$, respectively. The monohydric alcohol is then contacted with $P_2O_5$ or polyphosphoric acid as follows:

2. $R(OCH_2CH_2)_nOH + P_2O_5 \rightarrow R(OCH_2CH_2)_nOPO_3H$

The resulting acid can then be employed as the anionic surfactant constituent or it can be neutralized with ammonia, or an alkali metal hydroxide such as sodium hydroxide, potassium hydroxide, and the like as follows to the desired alkoxy polyethylene oxide phosphate ester:

3. $R(OCH_2CH_2)_nOPO_3H + M_2OH \rightarrow R(OCH_2CH_2)_nOPO_3M_2$.

The alkylphenoxy polyethylene oxide phosphate esters employed as a constituent of the present invention for the anionic surfactant are represented by the general formula $R_2—\Phi—(OCH_2CH_2)_nOPO_3M_2'$ were $n$ is an integer from about 6 to 10, $R_2$ is alkyl radical having about eight to 12 carbon atoms, and $M'$ is a cation selected from the group consisting of hydrogen, alkali metal, and ammonium. Suitable alkylphenoxy polyethylene oxide phosphate esters having such general formula which can be employed in the practice of the present invention can be prepared in accordance with the following series of steps:

1. 

where $R_2$ is an alkyl radical having between eight and 12 carbon atoms, such as n-octyl, n-decyl, n-dodecyl, and the like and $n$ is from about 6 to 10 moles of ethylene oxide. The catalyst employed can be either a basic catalyst, such as NaOH or an acidic catalyst, such as $BF_3$. The resulting alcohol is then contacted with $P_2O_5$ or polyphosphoric acid as follows:

2. $R_2—\Phi—(OCH_2CH_2)_nOH + P_2O_5 \rightarrow R_2—\Phi—(OCH_2CH_2)_nOPO_3H$

The resulting acid can be employed as the anionic surfactant constituent of the present dispersant composition, or it can be neutralized with ammonia or an alkali metal hydroxide, such as sodium hydroxide, potassium hydroxide and the like to produce the desired alkylphenoxy polyethylene oxide phosphate esters having the general formula $R_2—\Phi—(OCH_2CH_{2n}OPO_3M_2')$.

As is evident, $M'$ can be a cation selected from the group consisting of hydrogen, alkali metal, and ammonium depending on whether the acid so formed is neutralized and, if neutralized, the cation portion of the alkoxy polyethylene oxide phosphate ester will depend upon the particular cation present in the neutralizer.

The alkyl sulfonate which can be employed as the anionic surfactant constituent of the present composition is represented by the general formula $R_3SO_3M''$ where $R_3$ is an alkyl radical having from about 14 to 20 carbon atoms and $M''$ is a cation selected from the group consisting of alkali metal, and ammonium. Examples of suitable alkyl sulfonate compounds which can be employed in the practice of the present invention as the anionic surfactant constituent are:
sodium tetradecyl sulfonate
ammonium tetradecyl sulfonate
potassium pentadecyl sulfonate
ammonium hexadecyl sulfonate
sodium hexadecyl sulfonate
potassium octadecyl sulfonate
ammonium octadecyl sulfonate
sodium eicosanyl sulfonate
potassium eicosanyl sulfonate
ammonium eicosanyl sulfonate The alkyl aryl sulfonate compounds which can be employed as the anionic surfactant constituent of the present invention are represented by the general formula $R_4\Phi SO_3M'''$ where $R_4$ is an alkyl radical having about 14 to 20 carbon atoms and $M'''$ is a cation selected from the group consisting of alkali metal and ammonium. Examples of suitable alkyl aryl sulfonates which can be employed as the anionic surfactant constituent of the present invention are:
sodium tetradecyl benzene sulfonate
ammonium tetradecyl benzene sulfonate
potassium tetradecyl benzene sulfonate
sodium pentadecyl benzene sulfonate
ammonium pentadecyl benzene sulfonate
potassium hexadecyl benzene sulfonate
ammonium hexadecyl benzene sulfonate
sodium octadecyl benzene sulfonate
ammonium octadecyl benzene sulfonate
sodium eicosanyl benzene sulfonate
potassium eicosanyl benzene sulfonate
ammonium eicosanyl benzene sulfonate The sulfate compounds which can be employed as the anionic surfactant constituent of the present invention are represented by the general formula $R_5(OCH_2CH_2)_nOSO_3M_2''''$ where $R_5$ is an alkyl radical having from about 14 to 20 carbon atoms, $n$ is an integer of from about 0 to 6, and $M''''$ is a cation selected from the group consisting of alkali metal, such as sodium and potassium, and ammonium.

Suitable sulfate compounds having the above-described formula which can be employed as the anionic surfactant constituent of the present invention are prepared by the following series of steps:

1. 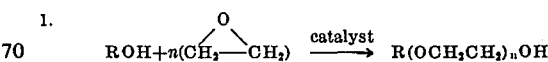

where R is a hydrocarbon group having between 14 and 20 carbon atoms, such as 2-tetradecyl, hexadecyl, octadecyl, 6-butyl-2-hexadecyl, eicosanyl, and the like, and $n$ is between 0 and 6 moles of ethylene oxide. The monohydric alcohol is then sulfated as followed to produce the corresponding sulfonic acid.

2. $R(OCH_2CH_2)_nOH + SO_3 \rightarrow R(OCH_2CH_2)_nOSO_3H$

The resulting sulfonic acid is then neutralized with ammonia or an alkali metal hydroxide, such as sodium hydroxide and potassium hydroxide. Thus, it is clearly seen that one can readily prepare an anionic surfactant containing a hydrocarbon radical containing from about 14 to 20 carbon atoms, and from about zero to six ethylene oxide groups. Further, the various types of cations can be attached to the sulfate group, depending upon the particular agent employed for the neutralization of the sulfonic acid.

The sulfation of the polyoxyethylated organic compound adds a hydrophilic sulfate group to the terminal hydroxy group at the end of the polyoxyethylene chain and the polyoxyethylated organic compound, such sulfation procedure can be carried out by processes which are known in the art. However, the sulfation procedure should be carried out under conditions which preclude substantial attack on the polyoxyethylene chain other than the addition of the sulfate group at the end of the chain.

The alkene sulfonate which can be employed as the anionic surfactant constituent of the dispersant composition is the reaction product prepared from sulfonating $C_{10}$ to $C_{24}$ olefins. The sulfonates $C_{10}$ to $C_{24}$ olefins are then hydrolyzed in the presence of an alkaline medium to produce a mixture containing by weight from about 30 to 70 percent of a quaternary mixture of double-bond positioned isomers of water-soluble salts of alkene-1sulfonic acids containing from 10 to 24 carbon atoms; from about 20 to 70 percent of water-soluble salts of bifunctionally substituted sulfur-containing saturated aliphatic compounds containing from 10 to 24 carbon atoms, the functional units being hydroxyl and sulfonate radicals with the sulfonate radical always being on the terminal carbon atoms and the hydroxyl radical being attached to a carbon atom separated by at least one carbon atom from the terminal carbon atom; and from about 2 to 15 percent of a mixture consisting of from 30 percent to 95 percent by weight of water-soluble slats of salts alkene disulfonates containing from 10 to 24 carbon atoms and from 5 percent to 70 percent by weight of water-soluble salts of hydroxy disulfonates containing from 10 to 24 carbon atoms.

The quaternary mixture of double-bond positional isomers of water-soluble salts of alkene-1-sulfonic acids containing from 10 to 24 carbon atoms is represented by the following formula:

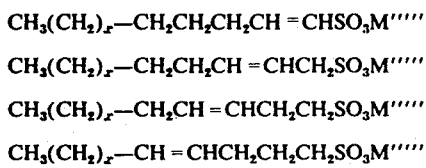

In the preceding formula, $x$ is an integer of from 4 to 18, preferably from 4 to 12, and $M''''''$ represents any cation that forms a water-soluble salt such as alkali metals, e.g., sodium and potassium, and ammonium, and substituted ammonium compounds, e.g., trialkylammonium and trialkylolammonium compounds. Specific examples of substituted ammonium compounds are triethylammonium, trimethylammonium, and triethanolammonium. Others will be apparent to those skilled in the art.

Examples of hydroxy alkyl sulfonates which may be used to make up the mixture of bifunctionally substituted sulfur-containing saturated aliphatic compounds of the above-described alkene sulfonate are as follows. Sodium is used in the following list of compounds as a representative water-soluble salt cation.

sodium 3-hydroxy-n-decyl-1-sulfonate
sodium 3-hydroxy-n-dodecyl-1-sulfonate
sodium 3-hydroxy-n-tetradecyl-1-sulfonate
sodium 3-hydroxy-n-hexadecyl-1-sulfonate
sodium 3-hydroxy-n-octadecyl-1-sulfonate
sodium 3-hydroxy-n-eicosyl-1-sulfonate
sodium 3-hydroxy-n-docosyl-1-sulfonate
sodium 3-hydroxy-n-tetracosyl-1-sulfonate
sodium 4-hydroxy-n-decyl-1-sulfonate
sodium 4-hydroxy-n-dodecyl-1-sulfonate
sodium 4-hydroxy-n-tetradecyl-1-sulfonate
sodium 4-hydroxy-n-hexadecyl-1-sulfonate
sodium 4-hydroxy-n-octadecyl-1-sulfonate
sodium 4-hydroxy-n-eicosyl-1-sulfonate
sodium 4-hydroxy-n-docosyl-1-sulfonate
sodium 4-hydroxy-n-tetracosyl-1-sulfonate
sodium 5-hydroxy-n-decyl-1-sulfonate
sodium 5-hydroxy-n-dodecyl-1-sulfonate
sodium 5-hydroxy-n-tetradecyl-1-sulfonate
sodium 5-hydroxyl-n-hexadecyl-1-sulfonate
sodium 5-hydroxy-n-octadecyl-1-sulfonate
sodium 5-hydroxy-n-eicosyl-1-sulfonate
sodium 5-hydroxy-n-docosyl-1-sulfonate
sodium 5-hydroxy-n-tetracosyl-1-sulfonate Examples of the water-soluble salts of alkene disulfonates are the sodium and potassium salts of 2-alkene-1, 2-disulfonate; 3-alkene-1,2-disulfonate; 4-alkene-1,2-disulfonate of the 1,2-disulfonate species; 3-alkene-1,3-disulfonate; 4-alkene-1,3-disulfonate; and 5-alkene-1,3-disulfonate of the 1,3-disulfonate series.

The water-soluble salts of hydroxy disulfonates containing from 10 to 24 carbon atoms have one of the sulfonate groups attached to the terminal carbon atom. The second sulfonate group can be attached to an internal carbon atom separated by not more than five carbon atoms from said terminal carbon atom. The hydroxy group is attached to a carbon atom which is separated by not more than three carbon atoms from the site of attachment of said second sulfonate group.

The preferred sites of attachment for the hydroxy group on the 1,2-disulfonate species are the fourth and fifth carbon atoms to yield 4-hydroxyalkane-1,2-disulfonates and 5-hydroxyalkane-1,3-disulfonates. For the 1,3-disulfonates the preferred sites of attachment for the hydroxy group are the fifth and the sixth carbon atoms to yield 5-hydroxyalkane-1,3-disulfonates and 6-hydroxyalkane-1,3-disulfonates.

In addition to the above-described anionic surfactants which can be admixed with from about 20 to 100 weight percent of a nonionic compound having the general formula $R_6(OCH_2CH_2)_nOH$ in which $R_6$ and $n$ are as previously described, we have further found that an effective oil dispersant composition can be formulated which contains from 80 to 0 weight percent pine oil and from 20 to 100 weight percent of the $R_6(OCH_2CH_2)_nOH$ nonionic constituent. However, when dispersing oil having an API gravity of at least 22, we prefer to employ from about 5 to 15 weight percent anionic surfactant or pine oil and from about 95 to 85 weight percent nonionic in the oil dispersant composition. Likewise, when dispersing oil having an API gravity of at least 22, we have found that a dispersant composition containing from about 10 to 40 weight percent of a hydrocarbon diluent and from about 90 to 60 weight percent of a mixture containing from about 80 to 0, preferably 5 to 15, weight percent of the anionic surfactant or pine oil and from about 20 to 100, preferably 95 to 85, weight percent of the nonionic compound, each of which has been previously described, can be effectively employed to emulsify and disperse such oil.

Any suitable hydrocarbon diluent can be employed; however, we prefer to use hydrocarbon diluents selected from paraffins having six to 12 atoms, alcohols having one to eight carbon atoms and petroleum distillates.

Examples of paraffins having six to 12 carbon atoms which can be employed as the diluent for an oil dispersant composition for removing oil spills where the oil has a gravity of at least 22 are n-hexane, n-dodocane, 3-methyl-undecane, n-decane, 4-ethyl octane, n-heptane, and the like. Alcohols having from one to eight carbon atoms which can be employed as the diluent are methanol, n-propanol, isopropanol, n-butanol, t-butanol, hexanol, n-octanol, 2-ethyl hexanol and the like. Likewise, the petroleum distillates which can be employed are represented by kerosene and pale oil. However, we prefer to employ the alcohols having one to eight carbon atoms as the diluent for the oil dispersant composition for use in removing oil spills where the oil has a gravity of at least 22. Most preferred of the alcohols is isopropyl alcohol.

When providing an oil dispersant composition for removing oil spills where the oil has a gravity of 22 or less, desired changes are made in the composition in order to more effectively disperse and emulsify the oil contained in the oil spill. In such dispersant composition the anionic surfactant is selected from the group consisting of an alkoxy polyethylene oxide phosphate ester or sulfate, an alkylphenoxy polyethylene oxide phosphate ester or sulfate, and alkyl or alkene sulfonate, and an alkyl aryl sulfonate, which is present in the range of about 40 to 60 weight percent and wherein the anionic surfactant is as previously defined, a nonionic component represented by the general formula $R_6O(CH_2CH_2O)_nH$ wherein $R_6$ and $n$ are as previously defined, and at least 20 weight percent of a petroleum distillate diluent. As is readily apparent to those skilled in the art, the various constituents can be varied within the above-identified ranges without adversely affecting the capabilities of the dispersant composition. However, we have found that an oil dispersant composition which contains about 50 weight percent of the anionic surfactant, about 30 weight percent of the nonionic component, and about 20 weight percent of the petroleum distillate diluent produces the desired results in emulsifying and dispersing oil slicks upon a body of water. Further, we prefer to use kerosene as the petroleum distillate diluent because of its accessibility.

The oil dispersant composition described above has been found to be very effective in the dispersion and emulsification of oil in water by causing the dispersed oil to spread throughout and below the surface of the surrounding water with no release of the oil back to the surface. Although the density of the oil dispersion has not been measured, it has been observed by the action of the resulting oil dispersion, which is darker in color than the surrounding water, that the density of the oil dispersion is about equal to the density of the water.

The oil dispersant formulation previously described can be contacted with the oil spill on the water or on the shore line by any suitable means, such as spraying the oil sought to be dispersed and emulsified with a mist of the dispersant composition. After spraying the oil with the dispersant composition, the dispersant and oil are allowed to remain in contact for 1 minute to several minutes. Thereafter, it is preferred to agitate the dispersant composition and the oil by any suitable method, such as with a fire hose, a motor boat, and the like. However, as is evident, when employing the oil dispersant upon an oil slick in the ocean, the wave action of the ocean may be sufficient in and of itself to sufficiently agitate the oil and oil dispersant composition to insure complete contact between the oil dispersant composition and the oil sought to be emulsified and dispersed. Once the oil dispersant composition and the oil are admixed so as to provide sufficient contact between the same, the oil is emulsified and dispersed below the surface of the water and held there, even upon infinite dilution, so that the oil slick is removed from the surface of the water. Further, because of the biodegradability properties of the oil dispersant composition once the oil is emulsified and dispersed below the surface of the water, sufficient catabolic action by micro-organisms consume the dispersant composition and the oil.

When the oil sought to be emulsified and dispersed is positioned upon a surface, such as a beach surrounding a body of water, the oil dispersant composition is contacted with the oil deposit by any suitable means, such as spraying the oil with a mist of the dispersant composition. The subsequent wave action upon the beach will thus wash the emulsified oil deposit and oil dispersant composition out into the water where the emulsified oil is dispersed below the surface of the water similar to oil spills on the surface of water as previously discussed. However, if the wave action around the beach area is not sufficient to wash the emulsified oil into the water for subsequent dispersion of the emulsified oil, a washing procedure such as with the use of a fire hose, and the like, can be employed to wash the emulsified oil and oil dispersant composition into the water. However, it is desirable when possible to allow the oil dispersant composition and the oil deposit to remain in contact with each other for from 1 minute to several minutes prior to the washing procedure so as to insure substantially complete emulsification of the oil deposit.

In order to more fully describe the present invention, the following examples are herein set forth. However, it is to be understood that the following examples are for illustrative purposes only and as such should not be construed to unduly limit the scope of the present invention.

EXAMPLE I

A series of experiments was conducted to evaluate oil dispersant compositions using the test described in Military Specification MIL-S-22864 (SHIPS) Mar. 28, 1961. The top portion of a painted metal 55-gallon drum was cut off so as to make a tank 28 inches in depth. A water stirring system was incorporated so that the water was drawn from the side of the tank about 1 inch off the bottom into a water pump and then pumped back into the tank through a pipe that was about 13-15 inches off the tank bottom and pointed directly downward. For the tests on brackish water a 0.35 percent salt (NaCl) solution (weight/volume; salt/tap water) was prepared by adding 372.75 grams of sodium chloride (NaCl bulk grade) to the test tank and for the tests on salt or sea water a 3.5 percent salt solution (weight/volume; salt/tap water) was prepared by adding 3727.5 grams of bulk grade sodium chloride to the test tank. Then for both brackish and salt water runs, the tank was filled to a depth of 16 inches (106.5 liters total volume) with tap water. The water pump was started and the oil slick was produced by adding either 10 or 100 ml. of oil to the tank.

The slick was treated with the dispersant-emulsifier by spraying the product onto the oil with a common household bottle sprayer. The dispersant-emulsifier was allowed to mix 2 minutes with oil and was then agitated by vigorously spraying the water-oil-slick mixture with tap water until the tank depth reached 18 inches or 119.8 liters total volume.

After agitation, the mixture was stirred for 10 minutes. A photograph of the tank's surface was taken and a description of the tank's surface as to foam and oil cover was made after 2 and 10 minutes of stirring. A sample of the mixture was also taken after 10 minutes of stirring by withdrawing a quart from the tank outlet, which is about 1 inch off the bottom of the tank. A Klett-Summerson Photometric Colorimeter absorptivity reading was taken on the withdrawn samples. In order to validify these absorptivity readings a background absorptivity reading was made on each sample as is described below in order to determine how much absorptivity was due solely to the dispersant-emulsifier and not to the emulsified oil.

Using a syringe, 9.4 of dispersant-emulsifier were placed in a 50-milliliter mixing graduated cylinder. Using a 3.5 percent (weight/volume; salt/tap water) salt solution, the graduated cylinder was filled to 50 milliliters and shaken vigorously. This gave the same concentration of dispersant-emulsifier/salt water as is created in the Navy Tank Test. The solution was then poured into a Colorimeter cell and the absorptivity using a Klett-Summerson Photometric Colorimeter was determined.

If foam obscured the surface after 10 minutes of stirring then either Corning's Antifoam A or 2-propanol was used to break the foam and check the amount of oil on the surface. A picture was also taken.

After the foam was broken, if the formulation appeared promising at this time, i.e., very little oil remained on the surface, then 1857.5 grams of salt was added to a salt water run or 185.75 grams of salt was added to a brackish water run, and the water level raised to a 26-inch total depth with stirring and no agitation. The tank was then drained down to an 18-inch total depth and the procedure repeated as described above. The foam and oil on the surface were again noted and a picture taken after the first, third and fifth dilution. The tank was emptied and a picture taken of the tank sides in some of the best runs.

EXAMPLE II

The tests were conducted in an area surrounded by oil booms to contain any oil which could contaminate the waterway if not dispersed. The boom was used primarily to contain the oil when the commercial dispersants were used because the lab tests showed that these products did a relatively poor job of dispersing the oil. THe oil, 5 gallons, was poured into the test area. THe dispersant was sprayed on the oil with a garden sprayer. After approximately 1 minute the oil was agitated with a stream of $H_2O$ from a fire hose. The test area was then inspected to determined how well the oil was dispersed. Crude oil 37.5 gravity and Bunker C fuel oil were used for the test. The data are below:

TABLE I

| Product | Ml. of product used | Absorp-tivity [1] | Comments |
|---|---|---|---|
| 45.0% pine oil; 6.6% isooctyl phenol + 9 ml. ethylene oxide; 7.0% alkylbenzene sulfonate; 2.0% oil; 39.4% $H_2O$. | 20 | 36 | Spreads oil completely over surface of tank. Does not appear to give an emulsion or dispersion. |
| 27.0% nonyl phenol + 7 ml. ethylene oxide; 6.0% alkyl aryl sulfonate; 3.0% sodium silicate; 0.1% sodium tripolyphosphate; 63.9% $H_2O$. | 20 | 164 | Smears of oil on surface. Around 50% of oil dispersed. |
| 30.0% castor oil ethoxylate; 36.0% $H_2O$; 34.0% isopropanol | 20 | 50 | Less than 50% of oil dispersed. |
| 45.0% lauic diethanolamide; 5.0% pine oil; 50.0% $H_2O$ | 20 | 54 | Foam on surface which lasted the full 10 minutes. 50% or more of oil left on surface. |
| 80.0% $C_{14}$ + 50% ethylene oxide; 20.0% alkyl phenoxy polyethylene oxide phosphate ester sodium salt. | 20 | 115 | Small oil globules on surface and some foam. 60-75% of oil removed from surface. |
| 80.0% $C_{14}$ + 60% ethylene oxide; 20.0% alky phenoxy polyethylene oxide phosphate ester sodium salt. | 20 | 79 | Foam generated when sprayed with water but disappeared within 10 minutes, leaving a small oil smear on the surface. Less than 50% of oil removed from surface. |
| 80.0% $C_{14}$ + 60% ethylene oxide; 20.0% alkyl phenoxy polyethylene oxide phosphate ester potassium salt. | 20 | 92 | Foam covered entire surface at start but slowly decreased to about 75% foam coverage at end of 10 minutes. Less than 50% of oil removed from surface. |
| 80.0% $C_{14}$ + 40% ethylene oxide; 20.0% alkyl phenoxy polyethylene oxide phosphate ester postassium salt. | 20 | 198 | Surface remained covered with foam the full 10 minutes. 70-80% of oil removed from surface. |
| 80.0% $C_{14}$ + 30% ethylene oxide, 20.0% alkyl phenoxy polyethylene oxide phosphate ester potassium salt. | 20 | 238 | Surface about 75% covered with foam. 80-90% of oil removed from surface. |
| 80.0% $C_{12}$ + 32.2% ethylene oxide; 20.0% alkyl phenoxy polyethylene oxide phosphate ester potassium salt. | 20 | 246 | Foam covered about 50% of surface at start but disappeared at 10 minutes. 80-90% of oil removed from surface. |
| $C_{14}$ + 30% ethylene oxide | 20 | 240 | Surface entirely covered with fluffy white foam. Slowly broke down with time. 80-90% of oil removed from surface. |
| $C_{12}$ + 32.2% ethylene oxide | 20 | 248 | No foam—appeared to have some emulsion float—at surface. 80-90% of oil removed from surface. |
| $C_{1218}$ + 40% ethylene oxide [2] | 20 | 224 | Thin layer of foam over entire surface at start. Covered about 50% at end of 10 minutes. 80-90% of oil removed from surface. |
| 90.0% $C_{1218}$ + 40% ethylene oxide [2]; 10.0% pine oil | 20 | 207 | Thin layer of foam over about 90% of surface. Remained at 10 minutes. 90% of oil removed from surface. |
| Do | 10 | 225 | About ¼ of surface covered with brown copious foam at start. In 10 minutes foam had disappeared, leaving a small emulsified oil slick. 80-90% of oil removed from surface. |
| 80.0% $C_{1218}$ + 40% ethylene oxide [2]; 20.0% pine oil | 10 | 240 | Tan copious foam covering about ¼ of surface. 80-90% of oil removed from surface. |
| 80.0% $C_{1412}$ + 40% ethylene oxide [3]; 20.0% pine oil | 10 | 222 | White copious foam over 25% of surface. 80-90% of oil removed from surface. |
| None | | 22 | Oil in globules on surface. At 10 minutes there was some brown foam. At least 90% of oil remained on surface. |

[1] Measured by Klett Colorimeter with a blue No. 42 filter.
[2] Alcohol blend—40% $C_{12}$, 30% $C_{14}$, 20% $C_{16}$, 10% $C_{18}$.
[3] Alcohol blend—65% $C_{12}$, 35% $C_{14}$.

TABLE II

| Crude oil—37.5 gravity dispersant composition | Product used, gal. | Comments |
|---|---|---|
| 27.0% nonyl phenol + 7 ml. ethylene oxide; 6.0% alkyl aryl sulfonate; 3.0% sodium silicate; 0.1% sodium tripolyphosphate; 63.9% $H_2O$. | 1 | Most of oil left on surface alongside of boom and along shore on downwind side of test area. |
| 30.0% castor oil ethoxylate; 36.0% $H_2O$; 34.0% isopropanol | 1 | Spread oil over a large area as soon as chemical was added. After agitation the oil was left on the surface alongside of boom and along shore on downwind side of test area. |
| 45.0% lauric diethanolamide; 5.0% pine oil; 50.0% $H_2O$ | 1 | Most of oil left on surface alongside of boom and along shore on downwind side of test area. |
| 90.0% $C_{1412}$ + 40% ethylene oxide [1]; 10.0% $C_{18}$ alkyl aryl sulfanate sodium salt. | ½ | The oil appeared to be well dispersed in water. The resulting dispersion then spread throughout the water. Essentially no oil was left on the surface. |
| 90.0% $C_{1412}$ + 40% ethylene oxide [1]; 10.0 pine oil | ½ | Same as previous run. |
| 50.0% $C_{18}$ alkyl aryl sulfonate sodium salt; 30.0% $C_{1412}$ + 40% ethylene oxide [1]; 20.0% kerosene. | 1 | Dispersed approximately 75% of oil but remainder stayed on surface. |
| 50.0% lauric diethanol amide; 30.0% $C_{1412}$ + 40% ethylene oxide [1]; 20.0% kerosene. | 1 | Dispersed approximately 75% of oil but remainder stayed on surface. |
| 27.0% nonyl phenol + 7 ml. ethylene oxide; 6.0% alkyl aryl sulfonate; 3.0% sodium silicate; 0.1% sodium tripolyphosphate; 63.9% $H_2O$. | 1 | Did not disperse oil to any extent. |
| 10.0% $C_{18}$ alkyl aryl sulfonate sodium salt; 70.0% $C_{1412}$ + 40% ethylene oxide [1]; 20.0% kerosene. | 1 | Approximately 50% of oil left on the surface. |
| 50.0% $C_{18}$ alkyl aryl sulfonate sodium salt; 30.0% $C_{1412}$ + 40% ethylene oxide [1]; 20.0% kerosene. | 1 | Removed 75-85% of oil from the surface and remaining oil was left as minute particles (mm.) which did not coagulate. |

[1] Alcohol blend—65% $C_{12}$, 35% $C_{14}$.

EXAMPLE III

Tests on the best products from above were repeated for demonstration purposes. Crude oil (37.5 gravity), 10 gallons, was dispersed with 1 gallon of formulations of 90 percent $C_{1412}$+40 percent ethylene oxide and 10 percent of either Bryton H430 sulfonate or pine oil. The results were excellent giving essentially complete removal of the oil from the surface.

EXAMPLE IV

A test was run on BUnker C fuel oil using 5 gallons of the oil and 1 gallon of the formulation of 50 percent Bryton H430, 30 percent $C_{1}412$+40 percent ethylene oxide, and 20 percent kerosene. Approximately 75–85 percent of the oil was dispersed and the remaining oil was left as small particles (<1 mm.) on the $H_2O$ surface.

EXAMPLE V

A series of experiments was conducted to determine the variations necessary in the dispersant composition in order to effectively disperse and emulsify various API gravity oils. The tests were conducted in accordance with the procedure substantially similar to that described in example I. The results of these experiments are tabulated as follows:

| Oil gravity | 90% $C_{1412}$ + 40% EO[1]; 10% $C_{18}$ alkyl aryl sulfonate sodium salt | 50% $C_{18}$ alkyl aryl sulfonate sodium salt; 30% $C_{1412}$ + 40% EO[1]; 20% kerosene |
|---|---|---|
| 13.0 | Poor | Good. |
| 22.2 | Fair | Poor-fair. |
| 22.9 | Good | Poor. |
| 23.4 | do | Do. |
| 28.3 | do | Do. |
| 30.0 | do | Do. |
| 37.5 | do | Do. |

[1] Ethylene oxide.

As is readily apparent from the above data, one can see the necessity of using at last 20 weight percent petroleum distillate in the dispersant composition when the oil to be emulsified and dispersed has an API gravity of 22 or less.

Having thus described the present invention, we claim:

1. A method for removing oil spills, where the oil has an API gravity of at least 22 which comprises contacting said spill with a composition consisting essentially of
   a. from about 15 to 5 weight percent of pine oil or an anionic surfactant selected from the group consisting of:
      1. alkoxy polyethylene oxide phosphate ester having the general formula $RO(CH_2CH_2O)_nPO_3M_2$ where $n$ is an integer of from about 2 to 10, R is an alkyl radical having about eight to 18 carbon atoms, and M is a cation selected from the group consisting of hydrogen, alkali metal, and ammonium;
      alkylphenoxy polyethylene oxide phosphate ester having the general formula $R_2—\Phi113\ O(CH_2CH_2O)_nPO_3M_2'$ where $n$ is an integer of from about 6 to 10, $R_2$ is an alkyl radical having about eight to 12 carbon atoms, and M' is a cation selected from the group consisting of hydrogen, alkali metal, and ammonium;
      3. an alkyl sulfonate having the general formula $R_3SO_3M''$ where $R_3$ is an alkyl radical having from about 14 to 20 carbon atoms and M'' is a cation selected from the grop consisting of alkali metals and ammonium;
      4. an alkyl aryl sulfonate having the general formula $R_4\Phi-SO_3M'''$ where $R_4$ is an alkyl radical having about 14 to 20 carbon atoms and M''' is a cation selected from the group consisting of alkali metals and ammonium;
      5. a sulfate having the general formula $R_5O(CH_2CH_2O)_nSO_3M''''$ where $R_5$ is an alkyl radical having from about 14 to 20 carbon atoms, $n$ is an integer of from about 0 to 6, and M'''' is a cation selected from the group consisting of alkali metal and ammonium;
      6. a water-soluble salt of an alkene sulfonate having from about 10 to 24 carbon atoms; and
   b. from about 85 to 95 weight percent of a nonionic compound having the general formula $R_6O(CH_2CH_2O)_nH$ in which $R_6$ is an alkyl radical having from about 10 to 20 carbon atoms and $n$ is an integer of from about 2–4.

2. A method according to claim 1 for removing oil spills where the oil has an API gravity of at least 22 wherein said anionic surfactant is present in the range of about 5–15 weight percent, and said nonionic compound is present in the range of about 95 to 85 weight percent.

3. A method according to claim 2 wherein said alkyl radical of said nonionic compound contains from about 12 to 20 carbon atoms and said integer has an average value within the range of about 2.5 to 3.0.

4. A method according to claim 3 wherein said anionic surfactant is present in the amount of about 10 weight percent and is a sodium salt derivative of an alkyl aryl sulfonate where the alkyl radical of said alkyl aryl sulfonate contains about 18 carbon atoms and said nonionic compound is present in the amount of about 90 weight percent.

5. A method according to claim 3 wherein the composition includes from about 10 to 40 weight percent of a hydrocarbon diluent and about 90 to 60 weight percent of a blend of said anionic surfactant and said nonionic compound.

6. The method according to claim 4 wherein said hydrocarbon diluent is selected from the group consisting of paraffins having six to 12 carbon atoms, alcohols having one to eight carbon atoms and petroleum distillates.

7. The method according to claim 6 wherein said diluent is isopropyl alcohol.

8. A method according to claim 1 for removing oil spills from a body of water where the oils have an API gravity of 22 or less wherein
   a. said anionic surfactant is present within the range of about 4 to 60 weight percent and is selected from the group consisting of:
      1. an alkoxy polyethylene oxide phosphate ester having the general formula $RO(CH_2CH_2O)_nPO_3M_2$ where $n$ is an integer of from about 2 to 10, R is an alkyl radical having about eight to 18 carbon atoms, and M is a cation selected from the group consisting of hydrogen alkali metal, an ammonium;
      2. an alkylphenoxy polyethylene oxide phosphate ester having the general formula $R_2—\Phi—O(CH_2CH_2O)_n-PO_3M_2'$ where $n$ is an integer of from about 6 to 10, $R_2$ is an alkyl radical having about eight to 12 carbon atoms, and M' is a cation selected from the group consisting of hydrogen, alkali metal, and ammonium;
      3. an alkyl sulfonate having the general formula $R_3SO_3M''$ where $R_3$ is an alkyl radical having from about 14 to 20 carbon atoms and M'' is a cation selected from the group consisting of alkali metals and ammonium;
      4. an alkyl aryl sulfonate having the general formula $R_4\Phi-SO_3M'''$ where $R_4$ is an alkyl radical having about 14 to 20 carbon atoms and M''' is a cation selected from the group consisting of alkali metals and ammonium;
      5. a sulfate having the general formula $R_5O(CH_2CH_2O)_nSO_3M''''$ where $R_5$ is an alkyl radical having from about 14 to 20 carbon atoms, $n$ is an integer of from about 0 to 6, and M'''' is a cation selected from the group consisting of alkali metal and ammonium;
   b. said nonionic component is present in the range of about 30 to 20 weight percent; and
   c. which includes at least 20 weight percent petroleum distillate diluent.

9. The method according to claim 8 wherein said diluent is kerosene and said composition consists of about 20 weight percent kerosene, 50 weight percent anionic surfactant, and about 30 weight percent nonionic component.

10. The method according to claim 9 wherein said anionic surfactant is a sodium salt derivative of an alkyl aryl sulfonate where the alkyl radical of said alkyl aryl sulfonate contains about 18 carbon atoms and said alkyl radical of said nonionic compound contains from about 12 to 14 carbon atoms and said integer has an average value within the range of about 2.5 and 3.0.

* * * * *

PO-1050
(5/69)

UNITED STATES PATENT OFFICE
CERTIFICATE OF CORRECTION

Patent No. 3,625,857      Dated December 7, 1971

Inventor(s) Dean R. Weimer and James A. Wingrave

It is certified that error appears in the above-identified patent and that said Letters Patent are hereby corrected as shown below:

Column 1, line 5, "2. Field of the Invention" should read --1. Field of the Invention--.

Column 1, line 34, "ANother" should read --Another--.

Column 2, line 48, "10 tO 20" should read --10 to 20--.

Column 2, line 62, "oil click" should read --oil slick--.

Column 3, step 2, line 47, after "to", insert --produce--.

Column 3, line 54, "⌽" should read --∅--.

Column 3, step 1, line 66, "$R_2-\emptyset-OH+nCH_2-CH_2)$" should read --$R_2-\emptyset-OH+n(CH_2-CH_2)$--.

Column 4, line 1, "⌽" should read --∅--.

Column 4, line 9, "⌽" should read --∅--.

Column 4, line 10, "$(OCH_2CH_2nOPO_3M_2'$" should read --$OCH_2CH_2)n-OPO_3M_2'$--.

Column 4, line 38, "$R_4\text{⌽}SO_3M'''$" should read --$R_4\emptyset SO_3M'''$--.

Column 5, line 28, "$C_1O$" should read --$C_{10}$--.

Column 5, line 43, "water-soluble slats of salts" should read --water-soluble salts of--.

Column 8, line 22, "MIlitary" should read --Military--.

PO-1050
(5/69)

UNITED STATES PATENT OFFICE
CERTIFICATE OF CORRECTION

Patent No. 3,625,857          Dated December 7, 1971

Inventor(s) Dean R. Weimer and James A. Wingrave    PAGE - 2

It is certified that error appears in the above-identified patent and that said Letters Patent are hereby corrected as shown below:

Column 10, line 4, "THe oil" should be --The oil--.

Column 10, line 5, "THe dispersant" should read --The dispersant--.

Table I, line 10, "45.0% lauic diethanolamide;" should read --45.0% lauric diethanolamide;--.

Table II, line 20, after 20.0% kerosene and before 27.0% nonyl phenol, insert --Bunker C Fuel Oil Dispersant Composition-- as a heading.

Column 11, line 12, "BUnker" should read --Bunker--.

Column 11, line 14 "$C_1412$" should read --$C_{1412}$--.

Column 11, line 48, "1. alkoxy" should read --1. An alkoxy--.

Column 11, line 54, before "alkylphenoxy", insert --2. An--.

Column 11, line 55, "$R_2-\emptyset 113 \ O(CH_2CH_2O)n \ PO_3M_2'$" should read --$R_2-\emptyset-O"CH_2CH_2O)n \ PO_3M_2'$--.

Column 11, line 63, "grop" should read --group--.

Column 11, line 64, "$R_4\emptyset$" should read --$R_4\emptyset$--

Column 11, line 69, "$n^J$" should read --n- --.

Column 12, line 11, "12 to 20" should read --12 to 14--.

Column 12, line 43, "$R_2-\emptyset$" should read --$R_2-\emptyset$--.

PO-1050
(5/69)

UNITED STATES PATENT OFFICE
CERTIFICATE OF CORRECTION

Patent No. 3,625,857    Dated December 7, 1971

Inventor(s) Dean R. Weimer and James A. Wingrave    PAGE - 3

It is certified that error appears in the above-identified patent and that said Letters Patent are hereby corrected as shown below:

Column 12, line 52, "$R_4\emptyset$" should read --$R_4\emptyset$--.

Column 12, line 56, "$n^J$" should read --n- --.

Signed and sealed this 13th day of June 1972.

(SEAL)
Attest:

EDWARD M. FLETCHER, JR.
Attesting Officer

ROBERT GOTTSCHALK
Commissioner of Patents